US011990820B2

(12) United States Patent
Mizoe

(10) Patent No.: US 11,990,820 B2
(45) Date of Patent: May 21, 2024

(54) MOTOR UNIT AND MOVING BODY

(71) Applicant: Panasonic Intellectual Property Management Co., Ltd., Osaka (JP)

(72) Inventor: Hajime Mizoe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 387 days.

(21) Appl. No.: 17/617,273

(22) PCT Filed: Apr. 27, 2020

(86) PCT No.: PCT/JP2020/017979
§ 371 (c)(1),
(2) Date: Dec. 7, 2021

(87) PCT Pub. No.: WO2020/255564
PCT Pub. Date: Dec. 24, 2020

(65) Prior Publication Data
US 2022/0345002 A1 Oct. 27, 2022

(30) Foreign Application Priority Data

Jun. 20, 2019 (JP) ................................. 2019-115002

(51) Int. Cl.
*H02K 5/22* (2006.01)
*F04D 25/06* (2006.01)
(Continued)

(52) U.S. Cl.
CPC .......... *H02K 5/225* (2013.01); *F04D 25/0693* (2013.01); *H02K 7/14* (2013.01);
(Continued)

(58) Field of Classification Search
CPC ............ H02K 5/22; H02K 5/225; H02K 7/14; H02K 15/0062; H02K 11/30; H02K 11/33; H02K 2203/03; H02K 2211/03
(Continued)

(56) References Cited

U.S. PATENT DOCUMENTS 5,126,608 A 6/1992 Sogabe et al.
9,948,160 B2 * 4/2018 Matsuyama ............. H02K 5/24
(Continued)

FOREIGN PATENT DOCUMENTS

EP 3852239 A1 * 7/2021 ........... H01R 12/515
JP 2-311137 12/1990
(Continued)

OTHER PUBLICATIONS

International Search Report of PCT application No. PCT/JP2020/017979 dated Jul. 28, 2020.
(Continued)

*Primary Examiner* — Jeremy A Luks
(74) *Attorney, Agent, or Firm* — Rimon P.C.

(57) ABSTRACT

A motor unit includes a motor, a substrate, a motor case, a connector, and a restriction portion. In the motor, a rotor including a rotary shaft extending in an axial center direction rotates about an axial center of the rotary shaft as a rotation center. The substrate is provided with a circuit element constituting a drive circuit for driving the motor. The motor case houses the motor and holds the substrate. The connector includes a connection terminal directly connected to the substrate. The restriction portion restricts displacement of the connector with respect to the substrate by coming into contact with the connector.

14 Claims, 12 Drawing Sheets

(51) Int. Cl.
   *H02K 7/14*       (2006.01)
   *H02K 11/33*      (2016.01)
   *H02K 15/00*      (2006.01)
   *H01R 25/00*      (2006.01)

(52) U.S. Cl.
   CPC ......... *H02K 11/33* (2016.01); *H02K 15/0062* (2013.01); *H01R 25/006* (2013.01)

(58) Field of Classification Search
   USPC .................................................. 310/68 R, 71
   See application file for complete search history.

(56) References Cited

U.S. PATENT DOCUMENTS

| 2007/0001527 A1* | 1/2007 | Takahashi | H02K 11/33 |
| | | | 310/67 R |
| 2015/0155759 A1 | 6/2015 | Matsuo et al. | |
| 2018/0316241 A1* | 11/2018 | Yamaoka | H02K 5/161 |
| 2019/0003485 A1 | 1/2019 | Nogamida et al. | |
| 2020/0052563 A1* | 2/2020 | Harada | H02K 5/225 |
| 2020/0062295 A1 | 2/2020 | Hattori et al. | |

FOREIGN PATENT DOCUMENTS

| JP | 5-064410 | 3/1993 |
| JP | 2015-106970 | 6/2015 |
| WO | 2018/096708 | 5/2018 |
| WO | 2018/142875 | 8/2018 |

OTHER PUBLICATIONS

The Extended European Search Report dated Jul. 21, 2022 for the related European Patent Application No. EP20827561.0.

* cited by examiner

MOTOR UNIT AND MOVING BODY

TECHNICAL FIELD

The present disclosure relates to a motor unit and a moving body, and more particularly, to a motor unit including a connector and a moving body including the motor unit.

BACKGROUND ART

PTL 1 describes a motor (motor unit) including a connector. The motor described in PTL 1 is configured such that a part of a housing of the motor is formed by molding a resin material, and a power supply connector to supply an excitation current is integrally molded with the housing.

However, the motor unit described in PTL 1 has such a problem that, when a force is applied to the connector, the connector is deformed, so that a stress is applied from the connector to a substrate. Therefore, there is a higher possibility that there occurs a trouble such as decrease in accuracy of electrical connection between the connector and the substrate.

CITATION LIST

Patent Literature

PTL 1: Unexamined Japanese Patent Publication No. H2-311137

SUMMARY OF THE INVENTION

The present disclosure has been made in view of the above point. An object of the present disclosure is to provide a motor unit and a moving body capable of alleviating a stress from a connector to a substrate.

A motor unit according to one aspect of the present disclosure includes a motor, a substrate, a motor case, a connector, and a restriction portion. In the motor, a rotor including a rotary shaft extending in an axial center direction rotates about an axial center of the rotary shaft as a rotation center. The substrate is provided with a circuit element constituting a drive circuit for driving the motor. The motor case houses the motor and holds the substrate. The connector includes a connection terminal directly connected to the substrate. The restriction portion restricts displacement of the connector with respect to the substrate by coming into contact with the connector.

In addition, the restriction portion preferably restrict displacement of the connector at least in the axial center direction.

In addition, an insertion and removal direction of the connector is preferably along a radial direction orthogonal to the axial center direction.

The motor unit may further include a fan and a fan case. The fan may be attached to a part of the rotary shaft protruding from the motor case. The fan case may house the fan. The restriction portion may include a protruding portion that protrudes from a part of the fan case and faces the connector.

The motor unit may further include a substrate guide. The substrate guide may support the substrate. The motor case may hold the substrate via the substrate guide.

The connector may be integrated with the substrate guide. The motor case may include a metal portion.

The motor unit may further include a bottom plate. The bottom plate may be attached to the motor case so as to cover an opening of the motor case. The restriction portion may include a contact portion. The contact portion may come into contact with the bottom plate when a force is applied to the connector toward a direction where the bottom plate is attached.

A predetermined gap is preferably provided between the bottom plate and the contact portion.

The bottom plate and the contact portion are preferably in contact with each other in a state where no external force is applied.

It is preferable that the contact portion has a thicker thickness in the radial direction orthogonal to the axial center direction than its periphery.

The restriction portion may include a claw portion that embraces the connector by snap-fitting.

The restriction portion may have a fixing portion that is formed integrally with the connector and is screwed to the fan case.

The connection terminal may include an elastic portion having elasticity.

The connector is preferably an insertion-mounting type connector.

A moving body according to one aspect of the present disclosure includes a motor unit and a moving body main body. The motor unit is mounted on the moving body main body.

A motor unit according to another aspect of the present disclosure includes a motor, a substrate, a motor case, and a connector. In the motor, a rotor including a rotary shaft extending in a direction of an axial center direction rotates about an axial center of the rotary shaft as a rotation center. The substrate is provided with a circuit element constituting a drive circuit for driving the motor. The motor case houses the motor and holds the substrate. The connector includes a connection terminal directly connected to the substrate. The connector further includes a housing portion that houses the connection terminal. The housing portion includes a first member and a second member. The first member is provided on a substrate guide. The second member is provided on a bottom plate.

A motor unit according to still another aspect of the present disclosure includes a motor, a substrate, a motor case, a fan, a fan case, and a connector. In the motor, a rotor including a rotary shaft extending in a direction of an axial center direction rotates about an axial center of the rotary shaft as a rotation center. The substrate is provided with a circuit element constituting a drive circuit for driving the motor. The motor case houses the motor and holds the substrate. The fan is rotated by the motor. The fan case houses the fan. The connector includes a connection terminal directly connected to the substrate. The connector further includes a housing portion that houses the connection terminal. The housing portion is provided integrally with the fan case.

According to the motor units and the moving bodies according to the above aspects of the present disclosure, a stress from the connector to the substrate can be alleviated.

DESCRIPTION OF EMBODIMENTS

Figure 1:
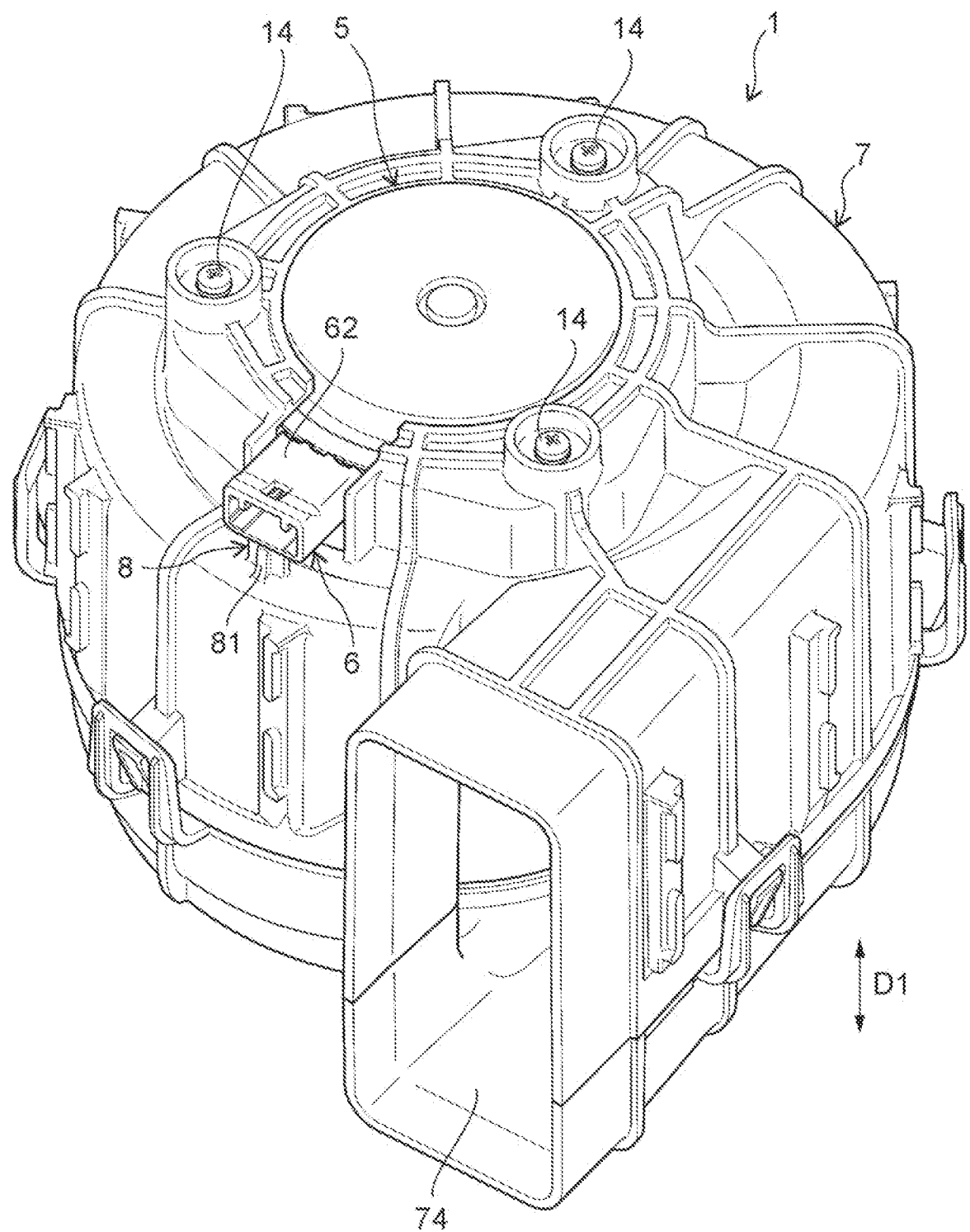
FIG. 1 is an external view of a motor unit according to a first exemplary embodiment.

Hereinafter, motor units according to first to fifth exemplary embodiments and a vehicle (moving body) according to a sixth exemplary embodiment will be described with reference to the drawings. The drawings referred to in the following exemplary embodiments and the like are schematic views, and ratios in sizes and thicknesses of components in the drawings do not necessarily reflect actual dimensional ratios.

First Exemplary Embodiment (1) Motor Unit

A configuration of motor unit 1 according to a first exemplary embodiment will be described with reference to the drawings.

Figure 3:
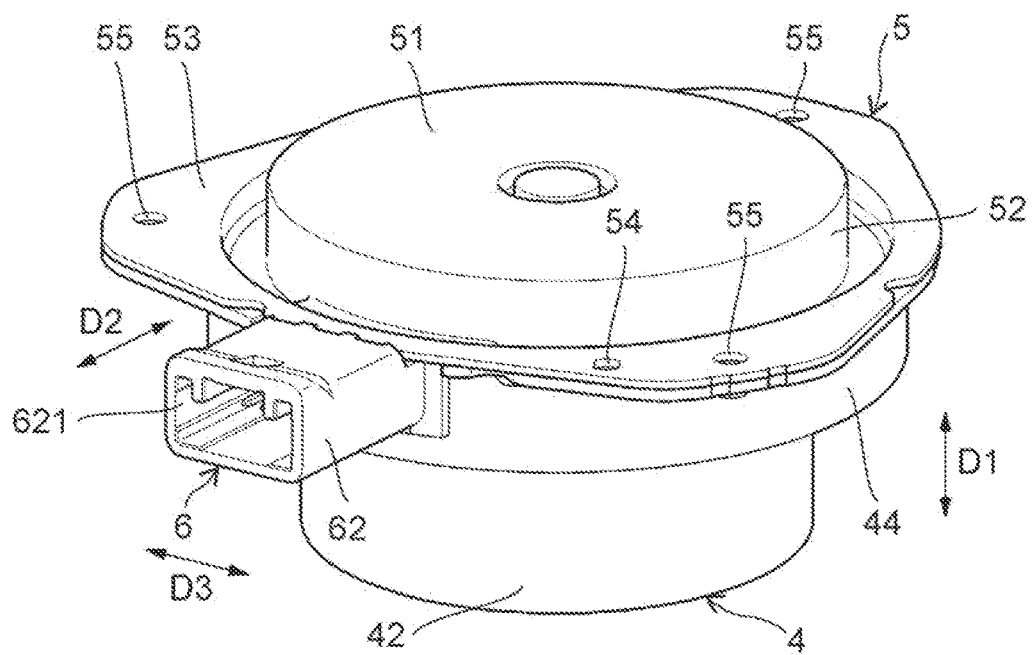
FIG. 3 is an external view of a main part of the motor unit of the first exemplary embodiment.
Figure 4:
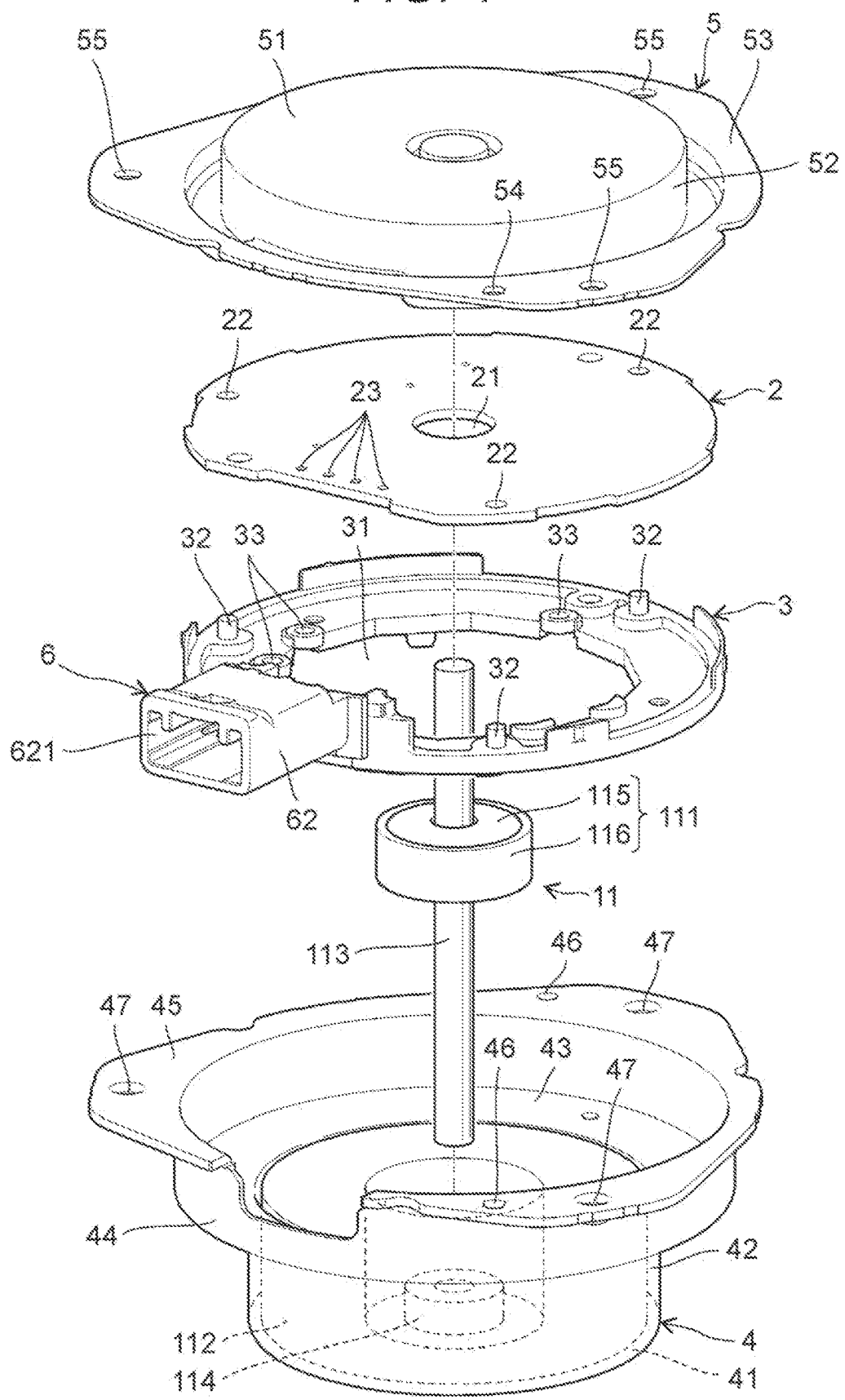
FIG. 4 is an exploded perspective view of a main part of the motor unit of the first exemplary embodiment.

FIG. 1 is an external view of motor unit 1 according to the first exemplary embodiment. FIG. 3 is an external view of a main part of motor unit 1 of the first exemplary embodiment. FIG. 4 is an exploded perspective view of a main part of motor unit 1 of the first exemplary embodiment. As illustrated in FIGS. 1, 3, and 4, motor unit 1 according to the first exemplary embodiment includes motor 11 (see FIG. 13), substrate 2, substrate guide 3, motor case 4, bottom plate 5, connector 6, fan 12 (see FIG. 13), fan case 7, and restriction portion 8.

Figure 13:
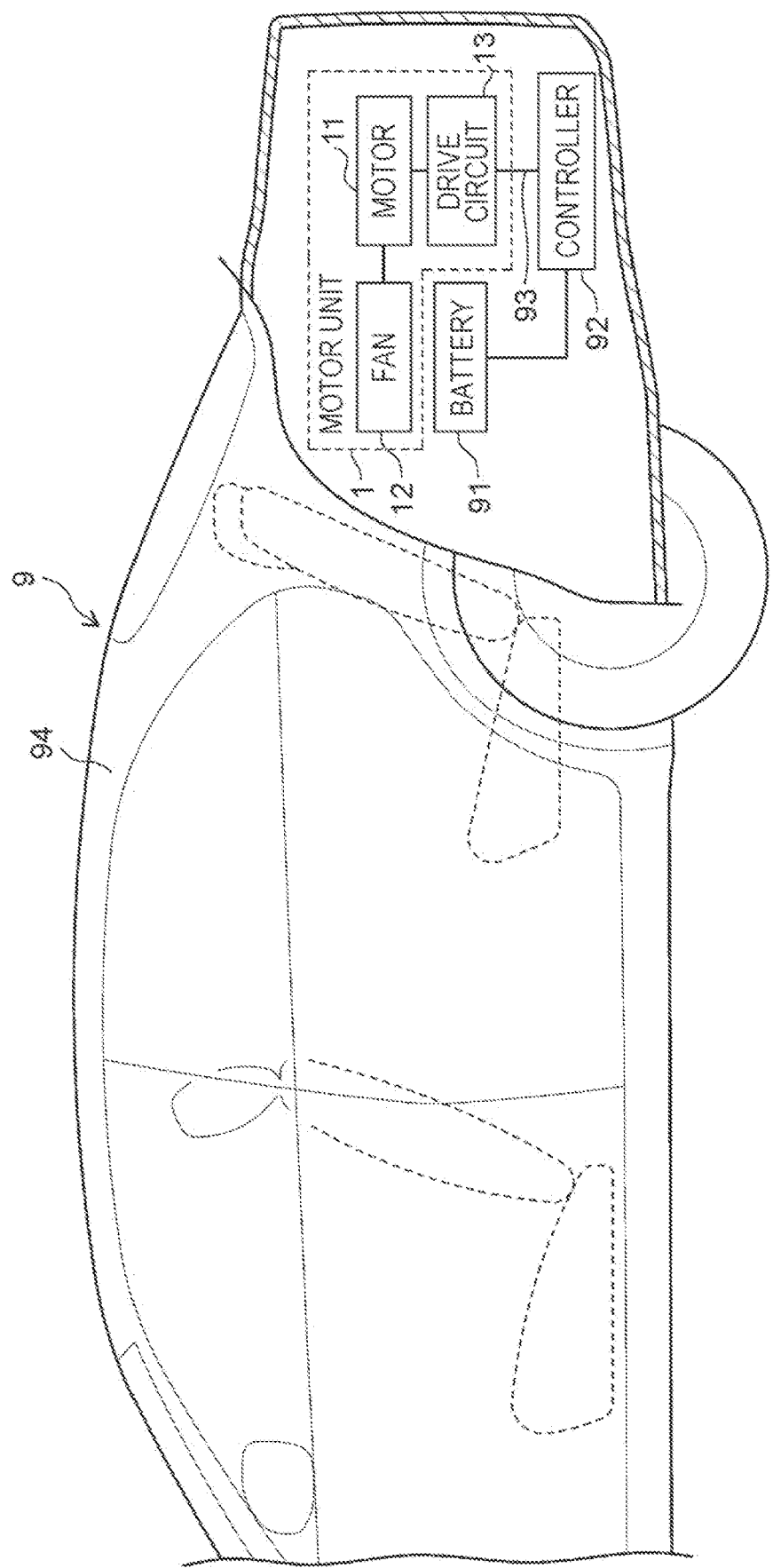
FIG. 13 is a schematic diagram of a vehicle according to a sixth exemplary embodiment.

Motor unit 1 is electrically connected to controller 92 (see FIG. 13) via cable 93 (see FIG. 13). In motor unit 1, electric power is supplied from controller 92 via cable 93, and motor 11 is rotationally driven on the basis of a control signal from controller 92.

Motor unit 1 is used for a moving body, for example. Examples of the moving body in which motor unit 1 is used include vehicles such as four-wheeled vehicles, two-wheeled vehicles, and three-wheeled vehicles.

(2) Components of Motor Unit

Hereinafter, each component of motor unit 1 according to the first exemplary embodiment will be described with reference to the drawings.

(2.1) Motor

As illustrated in FIG. 4, motor 11 is housed in motor case 4. Motor 11 includes rotor 111, stator 112 facing rotor 111, rotary shaft 113 extending in an axial center direction, and bearing 114 supporting rotary shaft 113. Rotor 111 includes rotor frame 115 and rotor magnet 116, and rotates about the axial center of rotary shaft 113 as a rotation center. In the first exemplary embodiment, motor 11 rotates about first direction D1 as the axial center direction. Motor 11 is, for example, an inner rotor type motor as illustrated in FIG. 4. Motor 11 is directly or indirectly connected to fan 12 (see FIG. 13), and fan 12 rotate in conjunction with rotation of motor 11. Motor 11 is not limited to the inner rotor type motor, and may be an outer rotor type motor.

(2.2) Substrate

Substrate 2 illustrated in FIG. 4 is, for example, a printed circuit board. Substrate 2 is formed in a substantially circular shape in plan view. Substrate 2 has, in its central part, through-hole 21 through which rotary shaft 113 passes. Substrate 2 has a plurality of (three in the illustrated example) attachment holes 22. Substrate 2 is housed in motor case 4 while being held by substrate guide 3.

Substrate 2 is provided with a plurality of circuit elements for driving motor 11. The plurality of circuit elements constitutes substrate 2 constitute drive circuit 13 (see FIG. 13) that drives motor 11. Drive circuit 13 is electrically connected to motor 11 via an electrical path such as a lead wire. Drive circuit 13 generates drive power for driving motor 11 from electric power supplied from controller 92 (see FIG. 13) via connector 6 and cable 93 (see FIG. 13). Drive circuit 13 supplies the generated drive power to motor 11. Motor 11 is rotationally driven by the drive power supplied from drive circuit 13.

(2.3) Substrate Guide

As illustrated in FIG. 4, substrate guide 3 is formed in an annular shape having opening 31 in the central part. Substrate 2 is disposed on a surface on one side of substrate guide 3 in first direction D1. Substrate guide 3 holds, in first direction D1, substrate 2 between bottom plate 5 and substrate guide 3. A plurality of (three in the illustrated example) protruding portions 32 are formed on an outer peripheral part of a surface of substrate guide 3 facing substrate 2. Each protruding portion 32 is formed in a columnar shape and protrudes in first direction D1. Each protruding portion 32 passes through circular attachment hole 22 formed in substrate 2 and is thermally caulked. As a result, substrate 2 is fixed to substrate guide 3. In substrate guide 3, a plurality of (three in the illustrated example) insertion holes 33 are formed in an outer circumferential part of opening 31. A lead wire that connects motor 11 and substrate 2 passes through each insertion hole 33.

(2.4) Motor Case

As shown in FIGS. 3 and 4, motor case 4 is a metal member formed in a bottomed cylindrical shape with one side in first direction D1 opened, and houses motor 11 therein.

Motor case 4 holds substrate 2. In the first exemplary embodiment, motor case 4 holds substrate 2 via substrate guide 3.

Motor case 4 includes bottom face portion 41, cylindrical portion 42, annular portion 43, cylindrical portion 44, and end portion 45. Bottom face portion 41, cylindrical portion 42, annular portion 43, cylindrical portion 44, and end portion 45 are integrally formed. Bottom face portion 41 has, for example, a disk shape. Cylindrical portion 42 is provided to protrude from an outer circumferential edge of bottom face portion 41. Annular portion 43 is provided at an end of cylindrical portion 42. Cylindrical portion 44 is provided to protrude from an outer circumferential edge of annular portion 43. End portion 45 is provided at an end of cylindrical portion 44. End portion 45 has a plurality of (two in the illustrated example) through-holes 46 and a plurality of (three in the illustrated example) through-holes 47.

(2.5) Bottom Plate

As illustrated in FIGS. 3 and 4, bottom plate 5 is a metal member formed in a bottomed cylindrical shape in which one side in first direction D1 is opened.

Bottom plate 5 includes bottom face portion 51, cylindrical portion 52, and end portion 53. Bottom face portion 51, cylindrical portion 52, and end portion 53 are integrally formed. Bottom face portion 51 has, for example, a disk shape. Cylindrical portion 52 is provided to protrude from an outer circumferential edge of bottom face portion 51. End portion 53 is provided at an end of cylindrical portion 52. End portion 53 has a plurality of (only one is illustrated) through-holes 54 and a plurality of (three in the illustrated example) through-holes 55.

Bottom plate 5 is attached to motor case 4 to cover the opening of motor case 4. More specifically, screws are inserted into the plurality of through-holes 46 of motor case 4 and the plurality of through-holes 54 of bottom plate 5, so that motor case 4 and bottom plate 5 are screwed together.

(2.6) Connector

Figure 2:
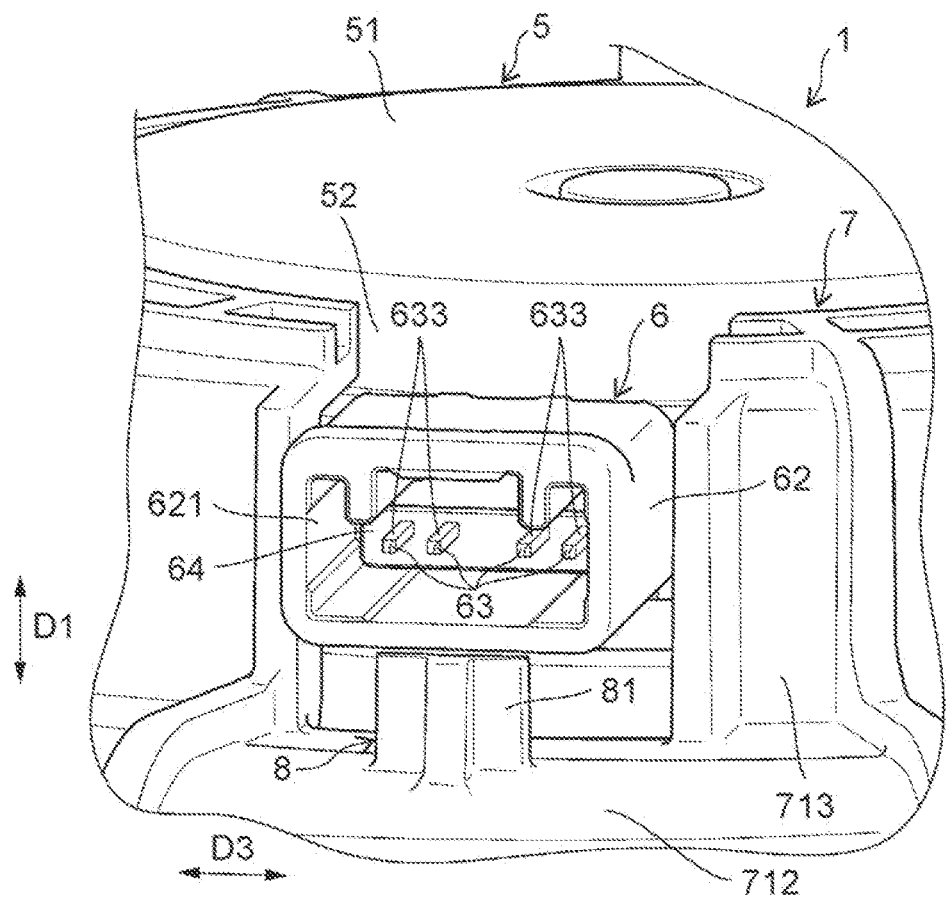
FIG. 2 is an enlarged view of a main part of the motor unit of the first exemplary embodiment.

FIG. 2 is an enlarged view of a main part of motor unit 1 according to the first exemplary embodiment. As illustrated in FIGS. 2 to 4, connector 6 is a connection member that electrically connects substrate 2 and cable 93 (see FIG. 13). Connector 6 is an insertion-mounting type connector, and an insertion and removal direction of connector 6 is along a second direction D2 (radial direction) orthogonal to first direction D1.

Figure 6:
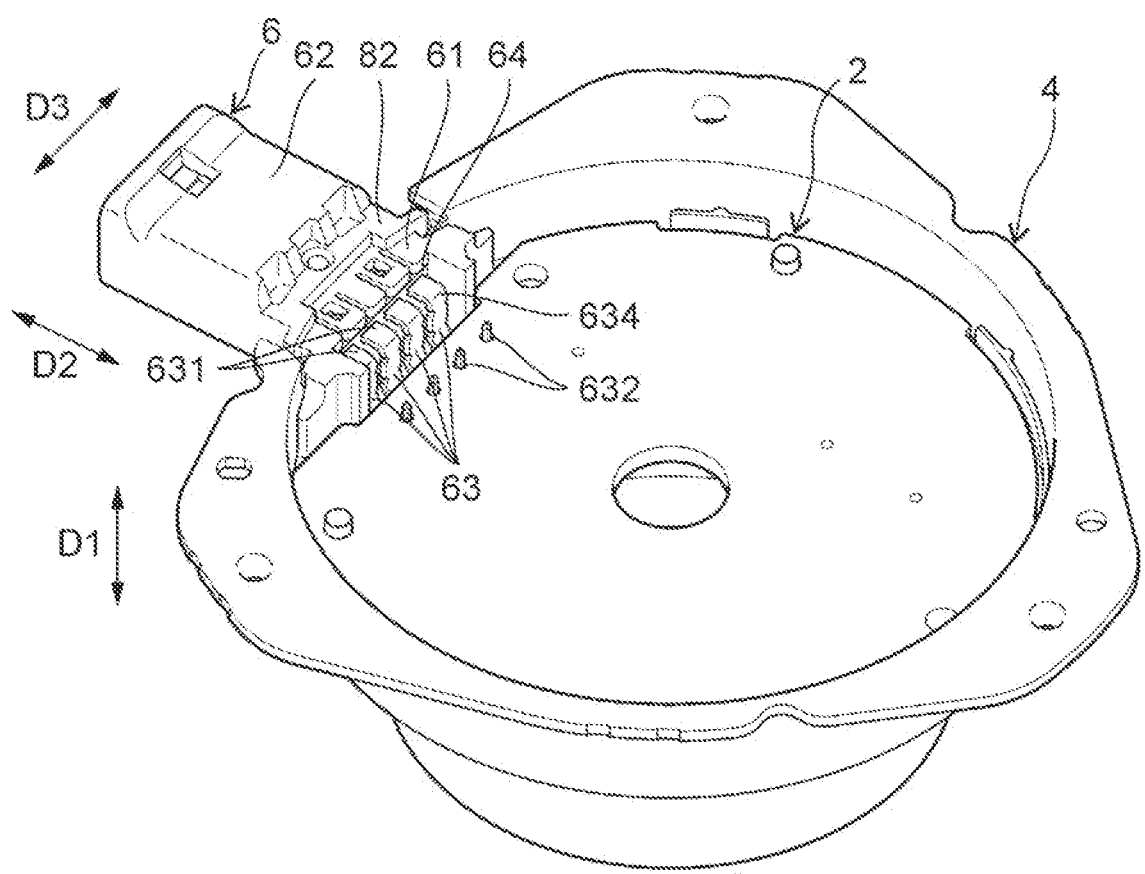
FIG. 6 is a perspective view illustrating how a connector is attached in the motor unit of the first exemplary embodiment.

FIG. 6 is a perspective view illustrating how connector 6 is attached in motor unit 1 according to the first exemplary embodiment. As illustrated in FIG. 6, connector 6 includes connection unit 61 and housing portion 62.

Connection unit 61 includes a plurality of (four in the first exemplary embodiment) connection terminals 63 and terminal holding portion 64.

The plurality of connection terminals 63 are directly connected to substrate 2. More specifically, the plurality of connection terminals 63 are electrically connected to substrate 2 and cable 93 (see FIG. 13). The plurality of connection terminals 63 are made of metal such as brass, for example. The plurality of connection terminals 63 are held by terminal holding portion 64 and are arranged in third direction D3. Third direction D3 is orthogonal to both first direction D1 and second direction D2.

Each connection terminal 63 has main body portion 631, substrate connection pin 632, and cable connection pin 633. In each connection terminal 63, main body portion 631, substrate connection pin 632, and cable connection pin 633 are integrally formed.

Each main body portion 631 is formed to connect substrate connection pin 632 formed at an end portion on one side in second direction D2 and cable connection pin 633 formed at an end portion on the other side in second direction D2. Each main body portion 631 is formed in a rectangular plate shape, and a part of each main body portion 631 is sealed by terminal holding portion 64 made of resin. The plurality of connection terminals 63 are integrally held by terminal holding portion 64.

Each connection terminal 63 has a plurality of (for example, three) bent portions bent substantially at a right angle. Having the plurality of bent portions, a part of each connection terminal 63 is formed in a substantially U shape when viewed from third direction D3. With this form, each connection terminal 63 has elasticity. A part, of each connection terminal 63, including a plurality of bent portions constitutes elastic portion 634 having elasticity.

The plurality of substrate connection pins 632 are formed to have a prismatic shape along first direction D1 and pass through pin insertion holes 23 formed in substrate 2. Each substrate connection pin 632 is soldered to substrate 2 and is thus electrically and mechanically connected to substrate 2.

The plurality of substrate connection pins 632 are formed to be aligned along third direction D3. In the first exemplary embodiment, the plurality of substrate connection pins 632 are formed at substantially equal intervals in third direction D3. The term "substantially equal intervals" as used herein includes not only a case where the intervals between the plurality of substrate connection pins 632 are perfectly the same but also a case where the intervals are displaced within a margin of error.

The plurality of cable connection pins 633 are formed to be aligned along third direction D3. Each cable connection pin 633 is formed to extend in second direction D2 from an end portion, of its corresponding main body portion 631, in second direction D2, and protrudes from terminal holding portion 64. Each cable connection pin 633 is electrically and mechanically connected to a pin receiving member of a connector of cable 93 (see FIG. 13).

Terminal holding portion 64 is a resin molded article made of poly butylene terephthalate (PBT) or the like, for example. Terminal holding portion 64 integrally holds the plurality of connection terminals 63. Specifically, terminal holding portion 64 holds the plurality of connection terminals 63 by hoop molding. In the hoop molding, terminal holding portion 64 is integrally molded with the plurality of connection terminals 63 connected to a frame. After the molding, connection terminals 63 are cut off from the frame. Further, connection terminals 63 are cut off from each other. In the first exemplary embodiment, terminal holding portion 64 and the plurality of connection terminals 63 are integrally formed by hoop molding. Therefore, manufacturing errors in positions of connection terminals 63 are suppressed as compared with insert molding in which a plurality of connection terminals 63 are integrally molded with terminal holding portion 64 while being independent of each other. The plurality of bent portions of each connection terminal 63 are formed by bending after terminal holding portion 64 is formed.

Housing portion 62 is a resin molded article made of PBT or the like, for example. In the first exemplary embodiment, housing portion 62 is formed integrally with substrate guide 3.

Housing portion 62 is formed in a rectangular tube shape having housing hole 621 penetrating in second direction D2. Housing portion 62 is formed to protrude in second direction D2 from an end part of substrate guide 3. Housing hole 621 is formed to have a rectangular cross section orthogonal to second direction D2. Connection unit 61 is inserted into housing hole 621 from one side (substrate guide 3 side) in second direction D2, and a connector of cable 93 (see FIG. 13) is inserted from the other side in second direction D2. As a result, the plurality of connection terminals 63 of connection unit 61 and cable 93 are electrically connected.

As described above, in connector 6, connection unit 61 having connection terminals 63 is formed separately from housing portion 62 that holds substrate 2. As a result, as compared with a case where the connection unit and the housing portion are integrally formed, workability when connection terminals 63 are assembled into connector 6 is improved, and manufacturing errors of the positions of connection terminals 63 at a time of manufacturing connection unit 61 can be reduced.

(2.7) Fan

Fan 12 (see FIG. 13) is rotated by motor 11 (see FIG. 13). More specifically, fan 12 is housed in fan case 7 to be directly or indirectly coupled to motor 11. For example, fan 12 is attached to a part of rotary shaft 113 protruding from motor case 4. In fan case 7, fan 12 rotates in conjunction with rotation of motor 11. Accordingly, the cooling effect can be enhanced.

(2.8) Fan Case

Fan case 7 illustrated in FIG. 1 houses fan 12 (see FIG. 13). Fan case 7 further houses motor case 4, bottom plate 5, and connector 6. Fan case 7 is formed of resin or the like.

Figure 7:
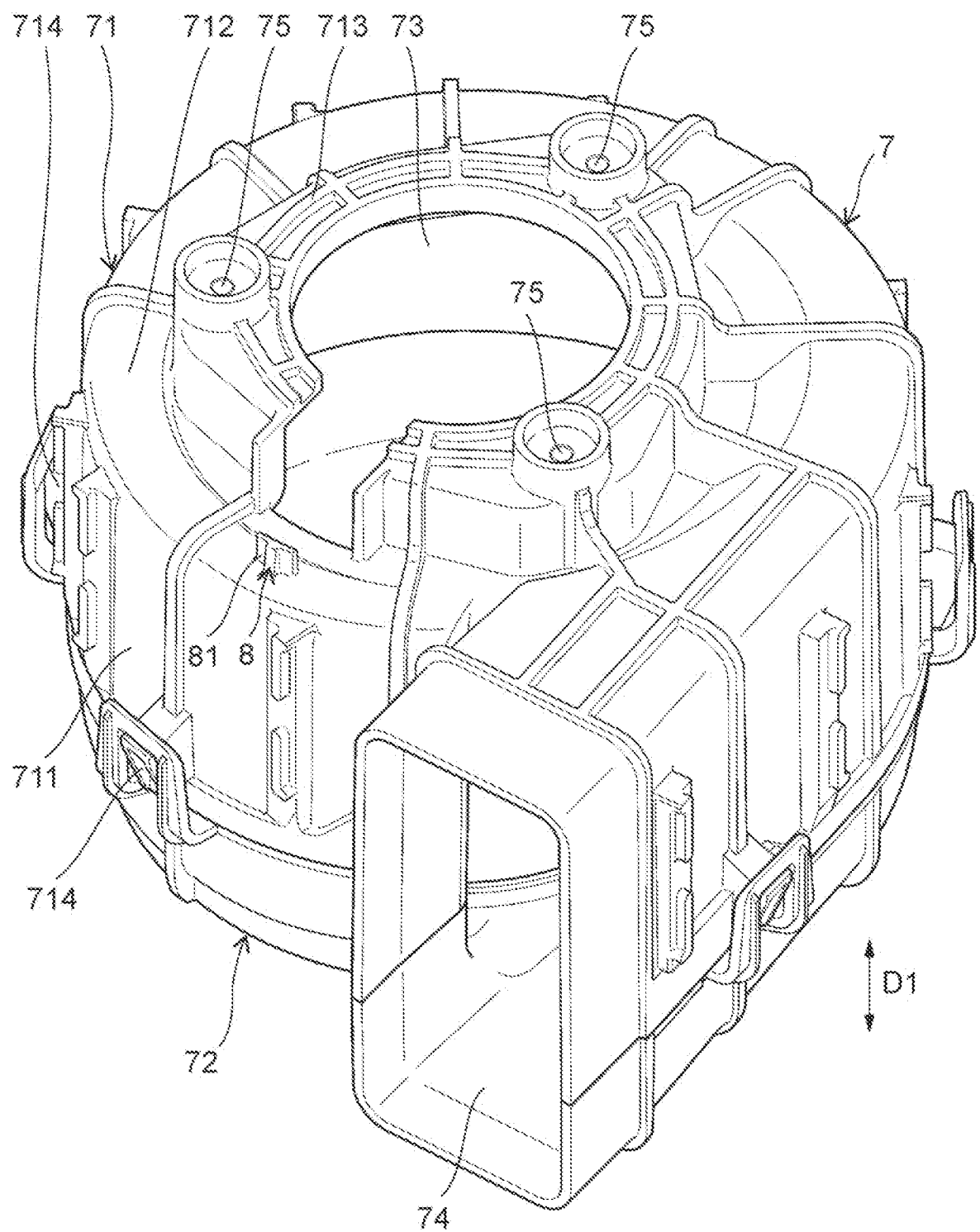
FIG. 7 is an external view of a fan case of the motor unit of the first exemplary embodiment.

FIG. 7 is an external view of fan case 7 of motor unit 1 according to the first exemplary embodiment. As illustrated in FIG. 7, fan case 7 includes first member 71 and second member 72. First member 71 includes base portion 711, annular portion 712, protruding portion 713, and a plurality of projecting portions 714. Base portion 711 has a tubular shape. Annular portion 712 protrudes inward from one end (upper end in FIG. 7) of base portion 711. Protruding portion 713 protrudes in first direction D1 from an inner circumferential end of annular portion 712. The plurality of projecting portions 714 are provided at the other end (lower end in FIG. 7) of base portion 711. The plurality of projecting portions 714 are provided at a certain distance from each other around the other end side of base portion 711.

Fan case 7 has opening 73. Opening 73 is formed in one end (upper end in FIG. 7) of fan case 7 in the first direction D1. Opening 73 has an opening surface having a normal line in first direction D1. When fan case 7 houses bottom plate 5, a part of bottom plate 5 is fitted into opening 73.

Fan case 7 has exhaust port 74 for air exhaustion. Exhaust port 74 has an opening surface having a normal line in a direction orthogonal to first direction D1.

Fan case 7 has a plurality of (three in the illustrated example) through-holes 75. The plurality of through-holes 75 are formed in first member 71. In a state where motor case 4 and bottom plate 5 are fixed to each other, screws 14 (see FIG. 1) are inserted into the plurality of through-holes 47 (see FIG. 4) of motor case 4, the plurality of through-holes 55 (see FIG. 4) of bottom plate 5, and the plurality of through-holes 75 of fan case 7, whereby motor case 4 and bottom plate 5 are attached to fan case 7.

(2.9) Restriction Portion

Restriction portion 8 illustrated in FIG. 2 restricts displacement of connector 6 with respect to substrate 2 by coming into contact with connector 6.

As illustrated in FIG. 2, restriction portion 8 includes protruding portion 81. Protruding portion 81 is made of resin or the like, protrudes from a part of fan case 7, and faces connector 6. More specifically, protruding portion 81 protrudes from a part of annular portion 712 of fan case 7 along first direction D1, and faces connector 6 via a gap in first direction D1. Protruding portion 81 is made of resin, for example. In the first exemplary embodiment, protruding portion 81 is formed integrally with fan case 7. When a force is applied to connector 6 in first direction D1 in such a direction that connector 6 gets closer to protruding portion 81 (downward in FIG. 2), connector 6 comes into contact with the protruding portion 81. When connector 6 has come into contact with protruding portion 81, connector 6 cannot be displaced further downward. Thus, the downward displacement of connector 6 can be restricted.

Figure 5A:
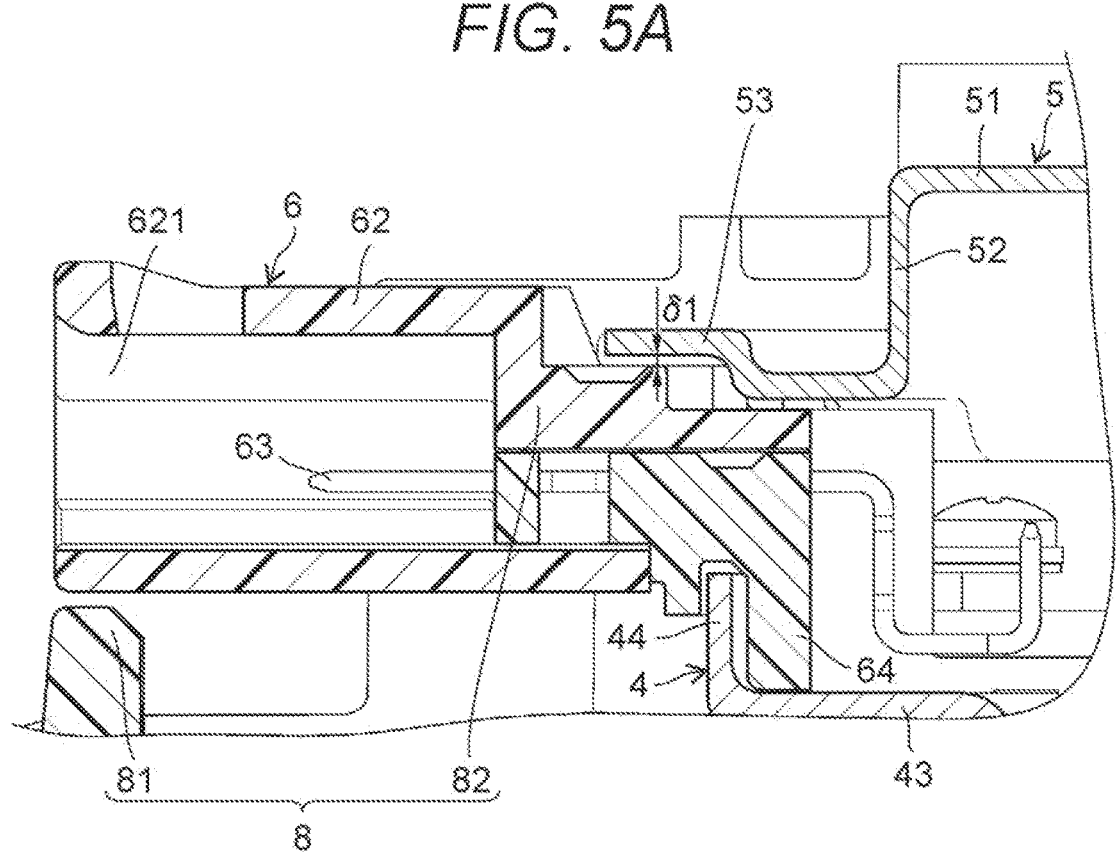
FIG. 5A is a cross-sectional view of a main part of the motor unit of the first exemplary embodiment in a normal state.
Figure 5B:
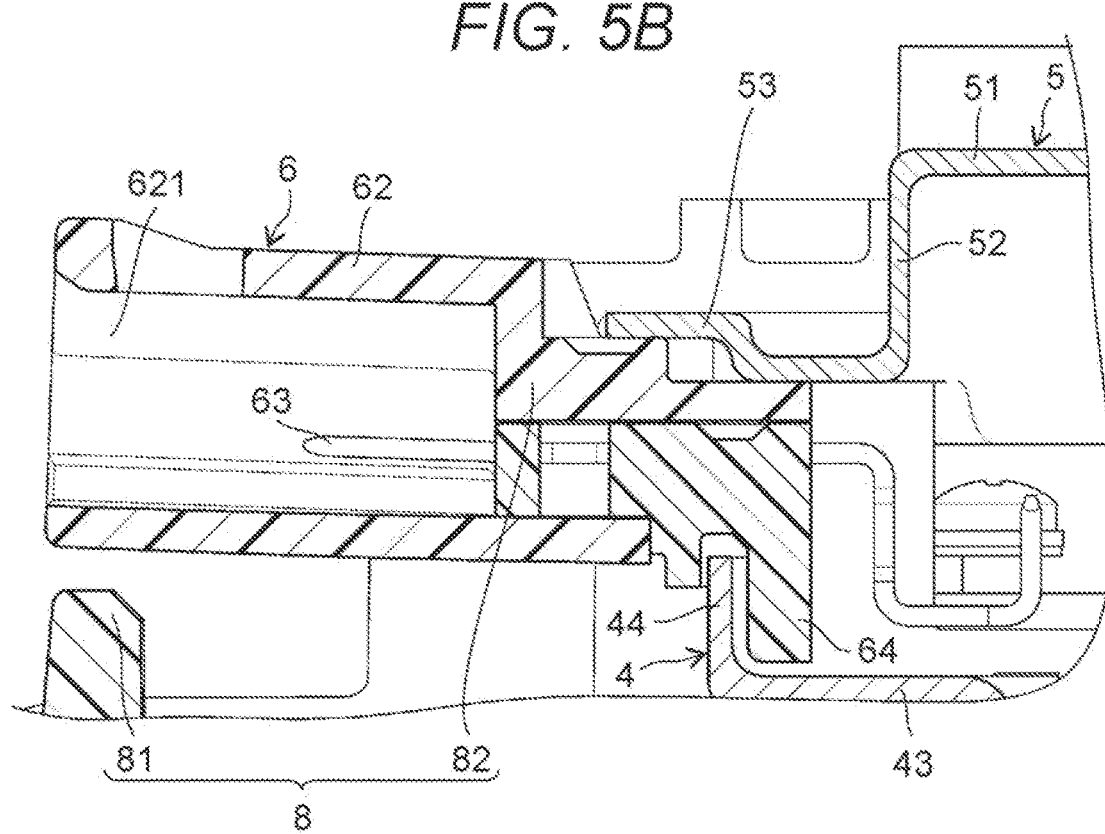
FIG. 5B is a cross-sectional view of a state where a force is applied in a main part of the motor unit of the first exemplary embodiment.

FIG. 5A is a cross-sectional view of a main part of the motor unit according to the first exemplary embodiment in a normal state. FIG. 5B is a cross-sectional view of a state where a force is applied in a main part of the motor unit of the first exemplary embodiment. As illustrated in FIG. 5A, restriction portion 8 includes contact portion 82. Contact portion 82 is formed of resin or the like. Contact portion 82 is provided on housing portion 62 of connector 6. Contact portion 82 has predetermined gap 61 between contact portion 82 and bottom plate 5. Contact portion 82 has a thicker thickness in the radial direction than its periphery. By these protruding portion 81 and contact portion 82, restriction portion 8 restricts the displacement of connector 6 at least in first direction D1. Specifically, as illustrated in FIG. 5B, contact portion 82 comes into contact with bottom plate 5 when a force is applied to connector 6 toward an opening side in first direction D1 (upward in FIG. 5B), in other words, when a force is applied along a direction in the axial center direction where bottom plate 5 is attached. Due to the contact between contact portion 82 and bottom plate 5, restriction portion 8 restricts the displacement of connector 6 in first direction D1. Note that protruding portion 81 and contact portion 82 restrict displacement in opposite directions to each other with respect to connector 6.

Note that contact portion 82 may be in contact with bottom plate 5 in a normal state where no force is applied to connector 6 toward the direction in the axial center direction in which bottom plate 5 is attached.

(3.) Advantageous Effects

In motor unit 1 according to the first exemplary embodiment, the displacement of connector 6 with respect to substrate 2 is restricted by restriction portion 8 coming into contact with connector 6. As a result, deformation of connector 6 can be reduced, and a stress from connector 6 to substrate 2 can therefore be alleviated.

In motor unit 1 according to the first exemplary embodiment, the displacement of connector 6 in the axial center direction (first direction D1) of motor 11 is restricted. As a result, the deformation of connector 6 in first direction D1 can be reduced, and the stress from connector 6 to substrate 2 can therefore be further alleviated.

In motor unit 1 according to the first exemplary embodiment, the insertion and removal direction of connector 6 is along the radial direction (second direction D2). As a result, it is possible to further alleviate the stress from connector 6 to substrate 2.

In motor unit 1 according to the first exemplary embodiment, there is provided protruding portion 81 that protrudes from a part of fan case 7 and faces connector 6. With this configuration, it is possible to form restriction portion 8 integrally with fan case 7.

In motor unit 1 according to the first exemplary embodiment, motor case 4 holds substrate 2 via substrate guide 3. This arrangement makes it possible to stably hold substrate 2.

In motor unit 1 according to the first exemplary embodiment, connector 6 is integrated with substrate guide 3. Therefore, a number of components of motor unit 1 can be reduced.

In motor unit 1 according to the first exemplary embodiment, there is provided contact portion 82 that comes into contact with bottom plate 5. With this configuration, deformation of connector 6 can be reduced due to restriction portion 8 coming into contact with bottom plate 5.

In motor unit 1 according to the first exemplary embodiment, connection terminal 63 including the elastic portion having elasticity is provided in connector 6. With this configuration, when a force is applied to connector 6, connection terminal 63 can alleviate the force.

Motor unit 1 according to the first exemplary embodiment includes insertion-mounting type connector 6. With this configuration, connector 6 can be easily connected to substrate 2 as compared with a surface mount connector.

(4) Variation

Hereinafter, a variation of the first exemplary embodiment will be described.

In the first exemplary embodiment, motor case 4 is made of metal, but it is not limited that motor case 4 is entirely made of metal portions. In the variation of the first exemplary embodiment, only a part of motor case 4 may be a metal portion. In short, motor case 4 preferably includes a metal portion.

For example, motor case 4 includes a resin member and a metal member. Motor case 4 holds substrate 2 with resin member. The resin member holds substrate 2 directly or via substrate guide 3. The metal member is provided in a periphery of the resin member. With this configuration, in motor case 4, it is possible that the resin member holds substrate 2, and at the same time, the metal member improves a shielding effect.

Also in motor unit 1 according to the above variation, it is possible to achieve advantageous effects similar to those in motor unit 1 according to the first exemplary embodiment.

Second Exemplary Embodiment

Figure 8:
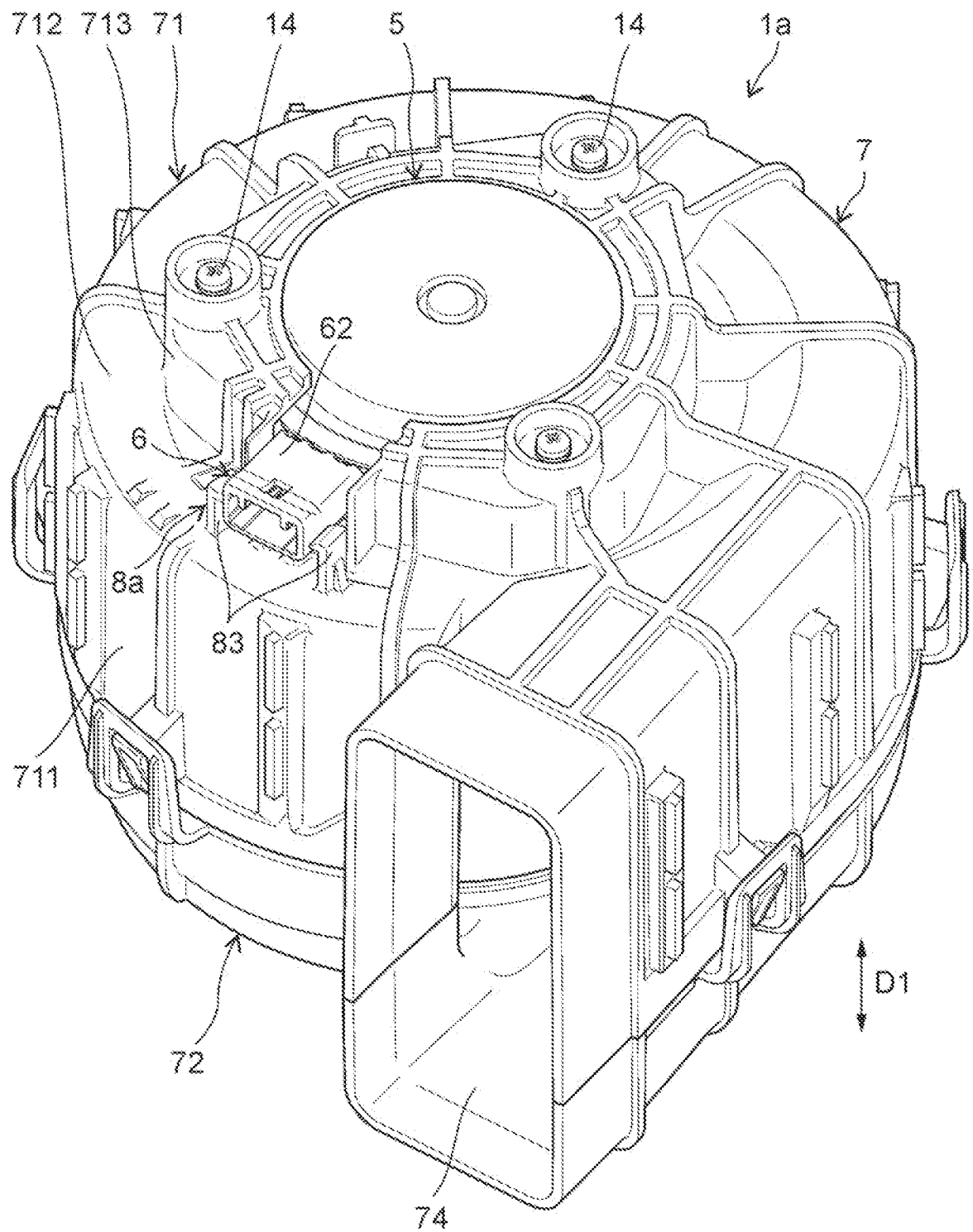
FIG. 8 is an external view of a motor unit according to a second exemplary embodiment.
Figure 9:
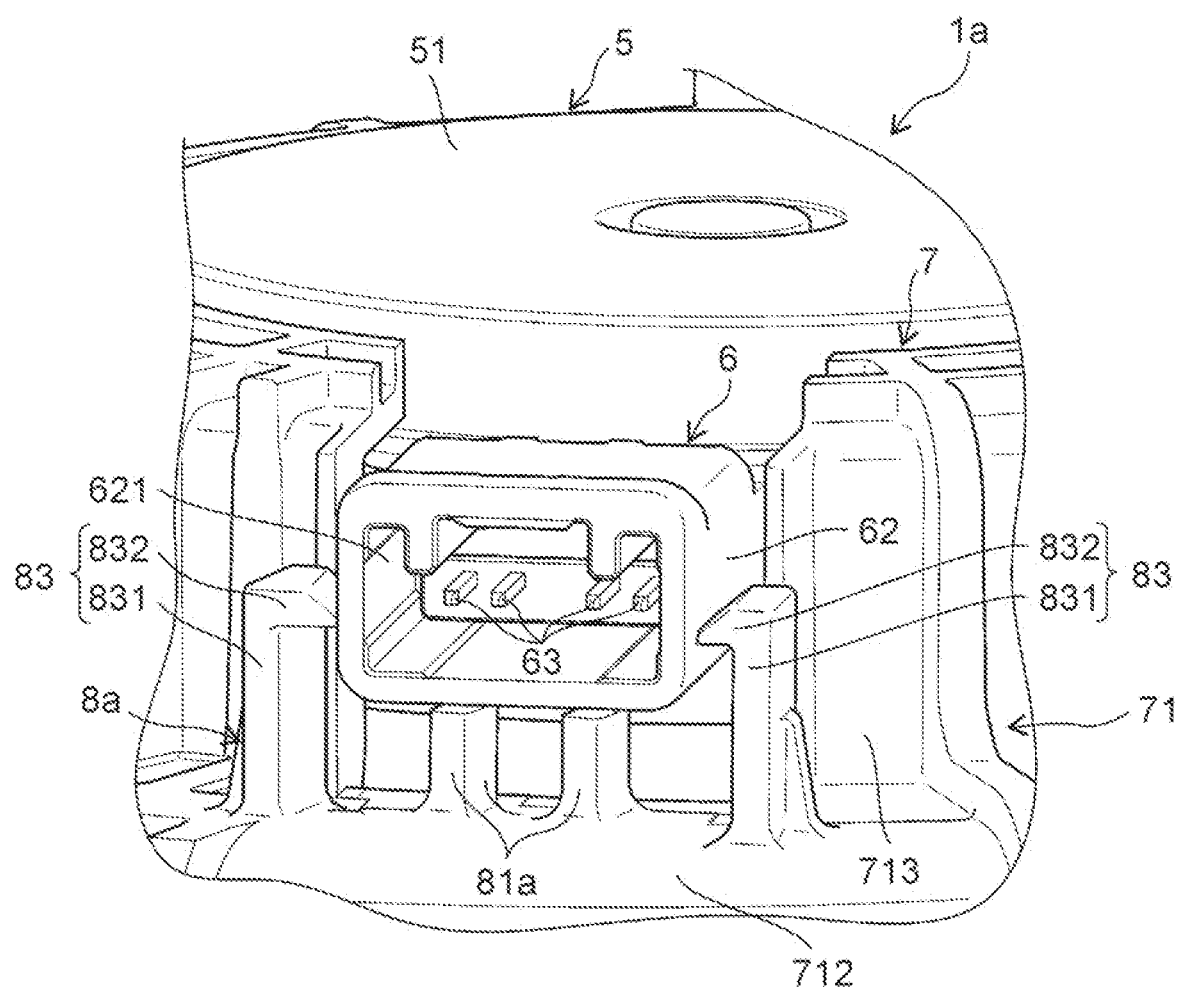
FIG. 9 is an enlarged view of a main part of the motor unit of the second exemplary embodiment.

FIG. 8 is an external view of motor unit 1a according to a second exemplary embodiment. FIG. 9 is an enlarged view of a main part of motor unit 1a of the second exemplary embodiment. As illustrated in FIGS. 8 and 9, motor unit 1a according to the second exemplary embodiment is different from motor unit 1 (see FIG. 1) according to the first exemplary embodiment in that motor unit 1a has a snap-fit structure. Note that, in motor unit 1a according to the second exemplary embodiment, the same components as those of motor unit 1 according to the first exemplary embodiment are assigned the same reference marks, and the description thereof will be omitted.

(1) Configuration

In a similar manner to motor unit 1 according to the first exemplary embodiment, motor unit 1a includes motor 11 (see FIG. 4), substrate 2, substrate guide 3, motor case 4, bottom plate 5, connector 6, fan 12 (see FIG. 13), and fan case 7. In addition, motor unit 1a includes restriction portion 8a as illustrated in FIGS. 8 and 9 instead of restriction portion 8 of the first exemplary embodiment.

Similarly to motor unit 1 according to the first exemplary embodiment, motor unit 1a is used for a moving body such as a vehicle.

As illustrated in FIGS. 8 and 9, restriction portion 8a includes a plurality of (two in the illustrated example) protruding portions 81a and a plurality of (two in the illustrated example) claw portions 83. Regarding restriction portion 8a of the second exemplary embodiment, the description of the same configuration and function as those of restriction portion 8 (see FIG. 2) of the first exemplary embodiment will be omitted.

The plurality of protruding portions 81a are provided side by side along third direction D3. Each protruding portion 81a has a rectangular plate shape, protrudes from a part of fan case 7, and faces connector 6. More specifically, each protruding portion 81a protrudes along first direction D1 from a part of annular portion 712 of fan case 7. Each protruding portion 81a faces connector 6 via a gap in first direction D1. Each protruding portion 81a is formed of, for example, resin. Each protruding portion 81a is formed integrally with fan case 7. Each protruding portion 81a is made of the same material as that of fan case 7.

The plurality of claw portions 83 embrace connector 6 by snap-fitting. Claw portions 83 protrude from a part of fan case 7 and are located on both sides of connector 6 in third direction D3. More specifically, each claw portion 83 protrudes from a part of annular portion 712 of fan case 7 along first direction D1. Each claw portion 83 is formed of, for example, resin. Each claw portion 83 is formed integrally with fan case 7. Each claw portion 83 is made of the same material as that of fan case 7.

Each of claw portion 83 has base portion 831 and end portion 832. Each base portion 831 and corresponding end portion 832 are integrally formed. Base portions 831 have a rectangular plate shape. One end of each base portion 831 in a longitudinal direction is connected to annular portion 712 of fan case 7. End portions 832 are each provided to protrude from the other end of one of base portions 831 toward a connector 6 side.

(2) Advantageous Effect

Motor unit 1a according to the second exemplary embodiment is provided with claw portions 83 that embrace connector 6. This configuration enables connector 6 to be fixed by snap-fitting. Therefore, the displacement of connector 6 can be easily restricted.

Third Exemplary Embodiment

Figure 10:
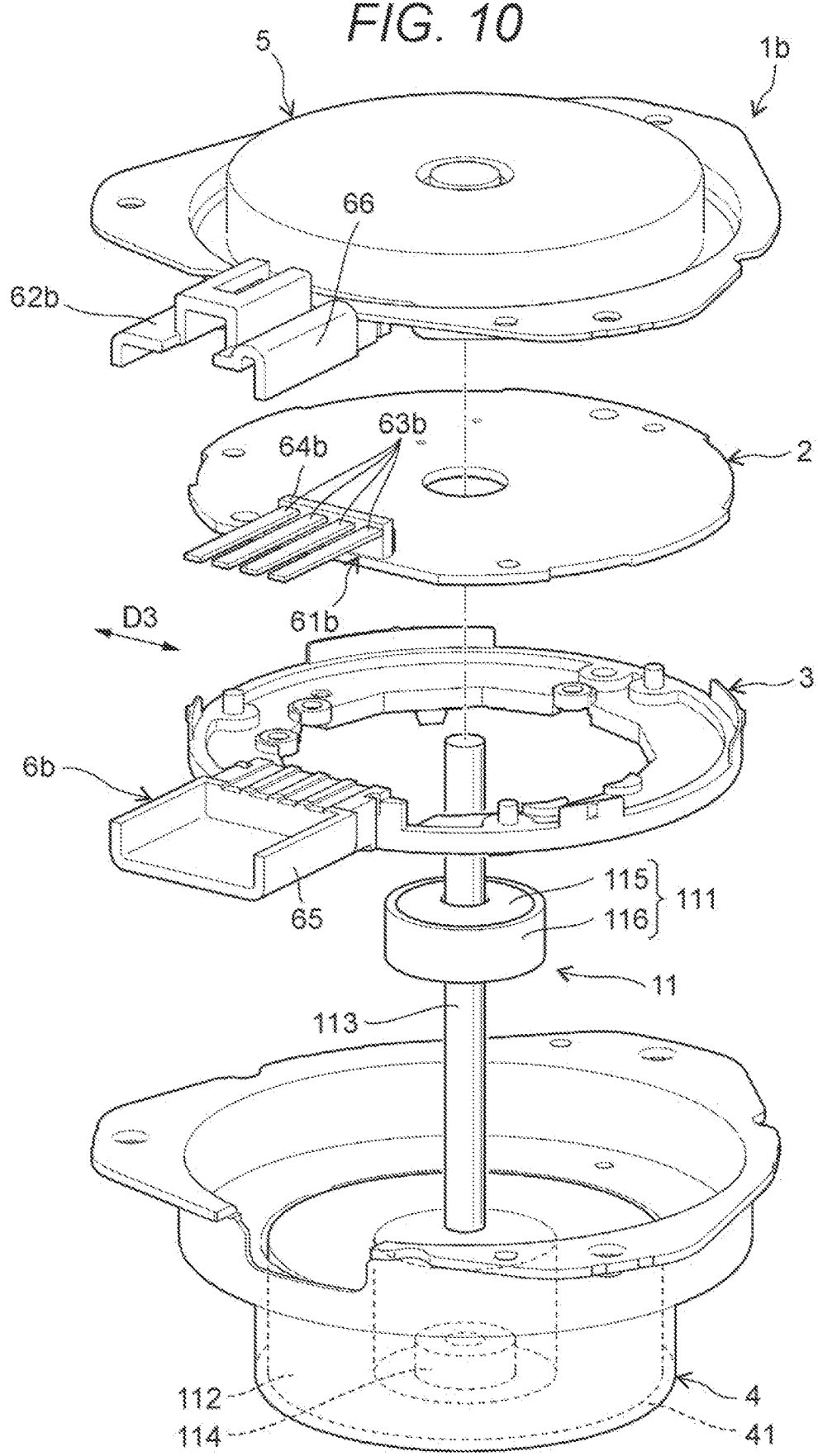
FIG. 10 is an exploded perspective view of a main part of a motor unit according to a third exemplary embodiment.

FIG. 10 is an exploded perspective view of a main part of motor unit 1b according to a third exemplary embodiment. As illustrated in FIG. 10, motor unit 1b according to the third exemplary embodiment is different from motor unit 1 (see FIG. 1) according to the first exemplary embodiment in that connector 6b is formed to be divided. Note that, in motor unit 1b according to the third exemplary embodiment, the same components as those of motor unit 1 according to the first exemplary embodiment are assigned the same reference marks, and the description thereof will be omitted.

(1) Configuration

In a similar manner to motor unit 1 according to the first exemplary embodiment, motor unit 1b includes motor 11, substrate 2, substrate guide 3, motor case 4, bottom plate 5, fan 12 (see FIG. 13), fan case 7, and restriction portion 8 (see FIG. 2). In addition, motor unit 1b includes connector 6b as illustrated in FIG. 10 instead of connector 6 (see FIG. 2) of the first exemplary embodiment.

Similarly to motor unit 1 according to the first exemplary embodiment, motor unit 1b is used for a moving body such as a vehicle.

As illustrated in FIG. 10, connector 6b includes connection unit 61b and housing portion 62b. Regarding connector 6b, the description of the same configuration and function as those of connector 6 (see FIG. 2) of the first exemplary embodiment will be omitted.

Connection unit 61b includes a plurality of (four in the illustrated example) connection terminals 63b and terminal holding portion 64b. The plurality of connection terminals 63b are connected to substrate 2. Terminal holding portion 64b is formed of, for example, resin, and is attached to substrate 2 with the plurality of connection terminals 63b arranged along third direction D3.

Housing portion 62b includes first member 65 and second member 66. First member 65 is formed integrally with substrate guide 3. Second member 66 is formed integrally with bottom plate 5. Because second member 66 is made of resin and bottom plate 5 is made of metal, second member 66 is formed integrally with bottom plate 5 by insert molding.

(2) Advantageous Effects

In motor unit 1b according to the third exemplary embodiment, a part of connector 6b is formed integrally with bottom plate 5. Specifically, of housing portion 62b of connector 6b, the second member 66 is formed integrally with bottom plate 5. This assembly can achieve cost reduction.

In motor unit 1b according to the third exemplary embodiment, terminal holding portion 64b of connector 6b is fixed to substrate 2. With this arrangement, it is possible to alleviate the stress from connector 6b to substrate 2.

(3) Variation

Motor unit 1b according to the third exemplary embodiment is not limited to having the configuration including restriction portion 8, and restriction portion 8 does not have to be included.

Fourth Exemplary Embodiment

Figure 11:
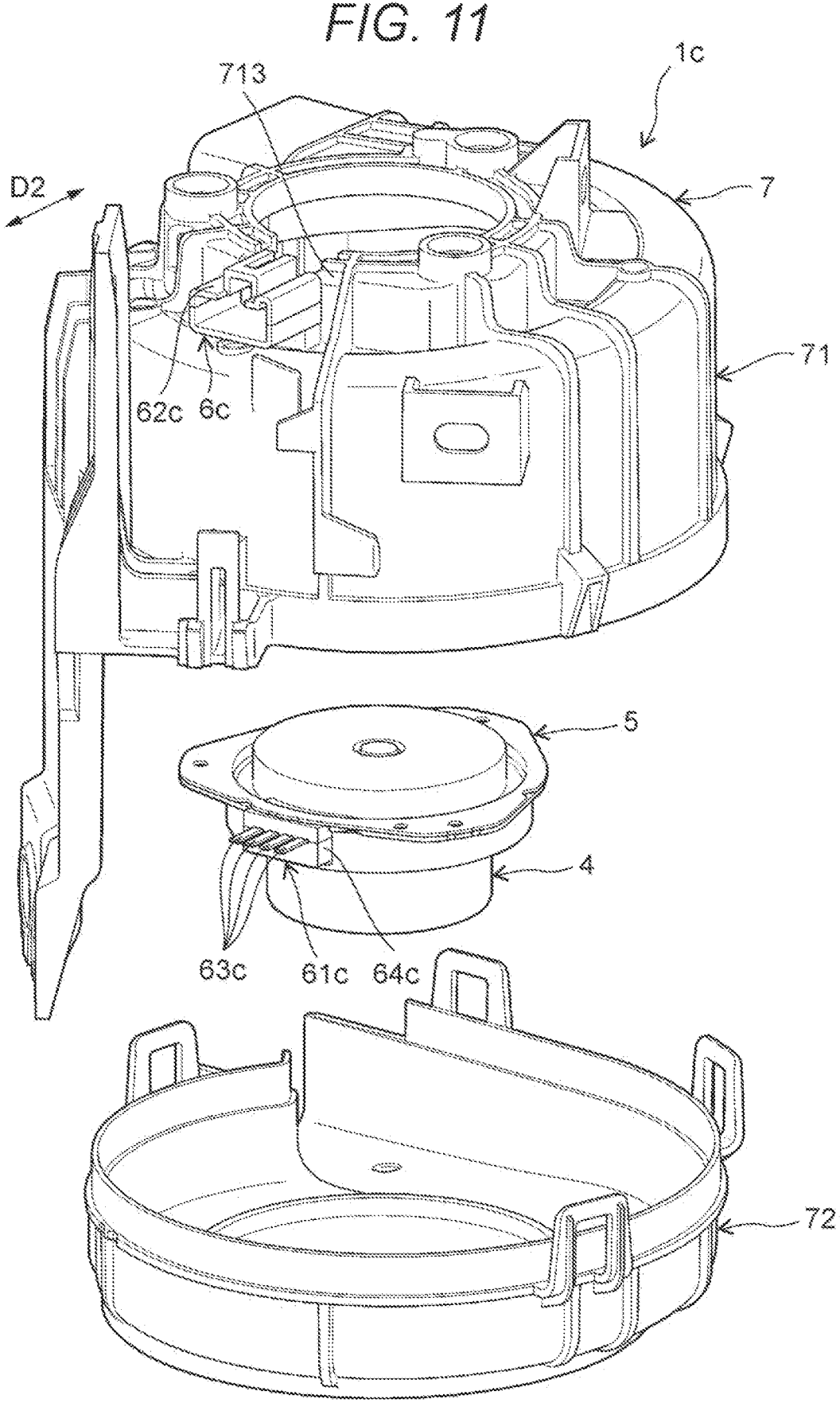
FIG. 11 is an exploded perspective view of a motor unit according to a fourth exemplary embodiment.

FIG. 11 is an exploded perspective view of motor unit 1c according to a fourth exemplary embodiment. As illustrated in FIG. 11, motor unit 1c according to the fourth exemplary embodiment is different from motor unit 1 (see FIG. 1) according to the first exemplary embodiment in that housing portion 62c of connector 6c is integrated with fan case 7.

(1) Configuration

In a similar manner to motor unit 1 according to the first exemplary embodiment, motor unit 1c includes motor 11 (see FIG. 4), substrate 2 (see FIG. 4), substrate guide 3 (see FIG. 4), motor case 4, bottom plate 5, fan 12 (see FIG. 13), fan case 7, and restriction portion 8. In addition, motor unit 1c includes connector 6c as illustrated in FIG. 11 instead of connector 6 of the first exemplary embodiment. Note that, in motor unit 1c according to the fourth exemplary embodiment, the same components as those of motor unit 1 according to the first exemplary embodiment are assigned the same reference marks, and the description thereof will be omitted.

Similarly to motor unit 1 according to the first exemplary embodiment, motor unit 1c is used for a moving body such as a vehicle.

As illustrated in FIG. 11, connector 6c includes connection unit 61c and housing portion 62c. Regarding connector 6c of the fourth exemplary embodiment, the description of the same configuration and function as those of connector 6 (see FIG. 2) of the first exemplary embodiment will be omitted.

Connection unit 61c includes a plurality of (four in the illustrated example) connection terminals 63c and terminal holding portion 64c. The plurality of connection terminals 63c are connected to substrate 2. Terminal holding portion 64c is formed of, for example, resin, and is attached to substrate 2 with the plurality of connection terminals 63c arranged along third direction D3.

Housing portion 62c is formed integrally with fan case 7. More specifically, housing portion 62c is provided to protrude from a part of protruding portion 713 of first member 71 of fan case 7 in second direction D2 (radial direction).

(2) Advantageous Effects

In motor unit 1c according to the fourth exemplary embodiment, housing portion 62c of connector 6c is formed integrally with fan case 7. As a result, a number of components of motor unit 1c can be reduced.

In motor unit 1c according to the fourth exemplary embodiment, terminal holding portion 64 is attached to substrate 2. With this arrangement, it is possible to alleviate the stress from connector 6c to substrate 2.

In motor unit 1c according to the fourth exemplary embodiment, the molds for motor case 4 and bottom plate 5 can be commonly used in contrast to a case where connector 6c is not provided.

(3) Variation

Motor unit 1c according to the fourth exemplary embodiment is not limited to having the configuration including restriction portion 8, and restriction portion 8 does not have to be included.

Fifth Exemplary Embodiment

Figure 12:
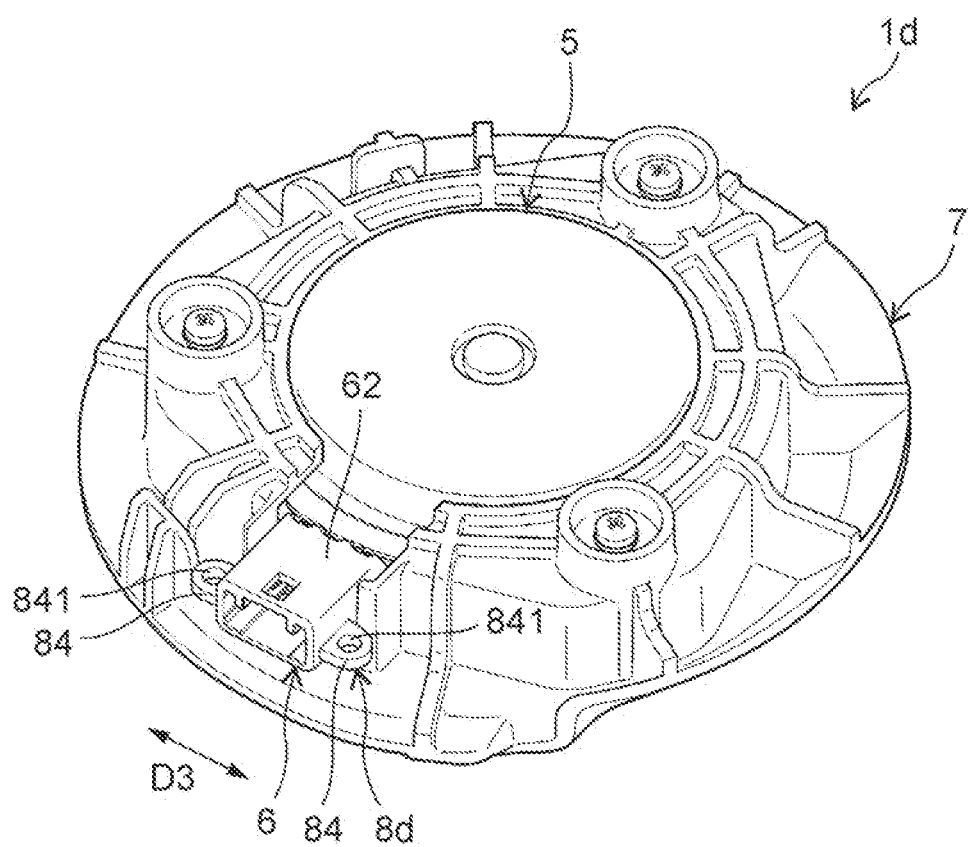
FIG. 12 is an external view of a main part of a motor unit according to a fifth exemplary embodiment.

FIG. 12 is an external view of a main part of motor unit 1d according to a fifth exemplary embodiment. As illustrated in FIG. 12, motor unit 1d according to the fifth exemplary embodiment is different from motor unit 1 (see FIG. 1) according to the first exemplary embodiment in that connector 6 is screwed to fan case 7.

(1) Configuration

In a similar manner to motor unit 1 according to the first exemplary embodiment, motor unit 1d includes motor 11 (see FIG. 4), substrate 2 (see FIG. 4), substrate guide 3 (see FIG. 4), motor case 4 (see FIG. 4), bottom plate 5, connector 6, fan 12 (see FIG. 13), and fan case 7. In addition, motor unit 1d includes restriction portion 8d as illustrated in FIG. 12 instead of restriction portion 8 of the first exemplary embodiment. Note that, in motor unit 1d according to the fifth exemplary embodiment, the same components as those of motor unit 1 according to the first exemplary embodiment are assigned the same reference marks, and the description thereof will be omitted.

Similarly to motor unit 1 according to the first exemplary embodiment, motor unit 1d is used for a moving body such as a vehicle.

As illustrated in FIG. 12, restriction portion 8d includes a plurality of (two in the illustrated example) fixing portions 84. Regarding restriction portion 8d of the fifth exemplary embodiment, the description of the same configuration and function as those of restriction portion 8 (see FIG. 2) of the first exemplary embodiment will be omitted.

The plurality of fixing portions 84 are formed integrally with connector 6. More specifically, the plurality of fixing portions 84 are provided to protrude from housing portion 62 of connector 6. More specifically, the plurality of fixing portions 84 protrude from housing portion 62 of connector 6 and are directed oppositely to each other in third direction D3. The plurality of fixing portions 84 are formed integrally with housing portion 62.

Each fixing portion 84 has through-hole 841. Each fixing portion 84 is screwed to fan case 7 by inserting a screw into through-hole 841.

(2) Advantageous Effect

In motor unit 1d according to the fifth exemplary embodiment, fixing portions 84 formed integrally with connector 6 are screwed to fan case 7. This arrangement makes it possible to reliably and easily suppress displacement of connector 6.

(3) Variation

Hereinafter, a variation of the fifth exemplary embodiment will be described.

Restriction portion 8d of motor unit 1d is not limited to having two fixing portions 84. Restriction portion 8d may have only one fixing portion 84 or may have three or more fixing portions 84. That is, restriction portion 8d only has to have at least one fixing portion 84.

Motor unit 1*d* according to the variation described above also achieves an advantageous effect similar to that of motor unit 1*d* according to the fifth exemplary embodiment.

Sixth Exemplary Embodiment

In a sixth exemplary embodiment, vehicle 9 (moving body) including motor unit 1 according to the first exemplary embodiment will be described with reference to the drawings.

(1) Configuration

FIG. 13 is a schematic diagram of vehicle 9 according to the sixth exemplary embodiment. As illustrated in FIG. 13, vehicle 9 according to the sixth exemplary embodiment includes motor unit 1, battery 91, controller 92, cable 93, and vehicle body 94 (moving body main body). Note that, in motor unit 1 according to the sixth exemplary embodiment, the same components as those of motor unit 1 (see FIG. 1) according to the first exemplary embodiment are assigned the same reference marks, and the description thereof will be omitted.

In the example of FIG. 13, vehicle 9 is a four-wheeled hybrid car in which an engine and battery 91 for driving are mounted on vehicle body 94. Vehicle 9 is not limited to a hybrid car, and may be an electric car.

Battery 91 is configured with, for example, a lithium-ion battery or a nickel-hydrogen battery. Battery 91 supplies electric power to motor 11, a drive motor for causing vehicle 9 to travel, and the like.

Controller 92 is electrically connected to motor unit 1 through cable 93. Controller 92 controls motor unit 1. More specifically, controller 92 is electrically connected to drive circuit 13 through cable 93 via connector 6. Controller 92 controls battery 91. More specifically, controller 92 controls power supply from battery 91 to motor 11, the drive motor, and the like.

Vehicle body 94 is provided with motor unit 1, battery 91, controller 92, and cable 93.

Motor unit 1 used in vehicle 9 functions as a cooling fan system to suppress a temperature rise of battery 91. In motor unit 1, when motor 11 is rotationally driven, fan 12 rotates, and air is sent to battery 91. As a result, battery 91 is air-cooled, and the temperature rise of battery 91 is suppressed.

(2) Advantageous Effect

Regarding vehicle 9 (moving body) according to the sixth exemplary embodiment, in motor unit 1, restriction portion 8 comes into contact with connector 6 to restrict the displacement of connector 6 with respect to substrate 2. This arrangement can reduce deformation of connector 6. Therefore, it is possible to alleviate the stress from connector 6 to substrate 2.

(3) Variations

In a variation of the sixth exemplary embodiment, vehicle 9 may include one of motor units 1*a* to 1*d* according to the second to fifth exemplary embodiments instead of motor unit 1 according to the first exemplary embodiment.

In another variation of the exemplary embodiment, the moving body including motor unit 1 is not limited to vehicle 9, and may be other things than vehicle 9. Also in the case of motor units 1*a* to 1*d* according to the second to fifth exemplary embodiments, as in the case of motor unit 1 according to first exemplary embodiment, the moving body is not limited to vehicle 9, and may be other things than vehicle 9.

Also vehicle 9 and moving bodies according to the above variations achieves an advantageous effect similar to that of vehicle 9 according to the sixth exemplary embodiment.

The exemplary embodiments and variations described above are merely a part of various exemplary embodiments and variations of the present invention. The exemplary embodiments and the variations can be variously modified depending on a design and the like as long as the object of the present invention can be achieved.

(Aspects)

The present specification discloses the following aspects.

Motor unit (1, 1*a*, 1*b*, 1*c*, 1*d*) according to a first aspect includes motor (11), substrate (2), motor case (4), connector (6, 6*b*, 6*c*), and restriction portion (8, 8*a*, 8*d*). In motor (11), rotor (111) including rotary shaft (113) extending in an axial center direction (first direction D1) rotates about an axial center of rotary shaft (113) as a rotation center. Substrate (2) is provided with a circuit element for driving motor (11). Motor case (4) houses motor (11) and holds substrate (2). Connector (6, 6*b*, 6*c*) includes a connection terminal directly connected to substrate (2). Restriction portion (8, 8*a*, 8*d*) comes into contact with connector (6, 6*b*, 6*c*) to restrict displacement of connector (6, 6*b*, 6*c*) with respect to substrate (2).

Motor unit (1, 1*a*, 1*b*, 1*c*, 1*d*) according to the first aspect can reduce deformation of connector (6, 6*b*, 6*c*). Therefore, a stress from connector (6, 6*b*, 6*c*) to substrate (2) can be alleviated.

In motor unit (1, 1*a*, 1*b*, 1*c*, 1*d*) according to a second aspect, restriction portion (8, 8*a*, 8*d*) restricts, in the first aspect, displacement of connector (6, 6*b*, 6*c*) at least in the axial center direction (first direction D1).

According to motor unit (1, 1*a*, 1*b*, 1*c*, 1*d*) of the second aspect, it is possible to reduce deformation of connector (6, 6*b*, 6*c*) in the axial center direction (first direction D1). Therefore, the stress from connector (6, 6*b*, 6*c*) to substrate (2) can be further alleviated.

In motor unit (1, 1*a*, 1*b*, 1*c*, 1*d*) according to a third aspect, an insertion and removal direction of connector (6, 6*b*, 6*c*) is along a radial direction (second direction D2) orthogonal to the axial center direction (first direction D1), in the first or second aspect.

With motor unit (1, 1*a*, 1*b*, 1*c*, 1*d*) according to the third aspect, it is possible to further alleviate the stress from connector (6, 6*b*, 6*c*) to substrate (2).

Motor unit (1, 1*a*, 1*b*, 1*c*) according to a fourth aspect further includes, in any one of the first to third aspects, fan (12) and fan case (7). Fan (12) is attached to a part, of rotary shaft (113), protruding from motor case (4). Fan case (7) houses fan (12). Restriction portion (8, 8*a*) includes protruding portion (81, 81*a*) that protrudes from a part of fan case (7) and faces connector (6, 6*b*, 6*c*).

With motor unit (1, 1*a*, 1*b*, 1*c*) according to the fourth aspect, restriction portion (8, 8*a*) can be integrally formed with fan case (7).

Motor unit (1, 1*a*, 1*b*, 1*c*, 1*d*) according to a fifth aspect further includes, in any one of the first to fourth aspects, substrate guide (3). Substrate guide (3) supports substrate (2). Motor case (4) holds substrate (2) via substrate guide (3).

With motor unit (1, 1*a*, 1*b*, 1*c*, 1*d*) according to the fifth aspect, substrate (2) can be stably held.

In motor unit (1, 1*a*, 1*b*, 1*c*, 1*d*) according to a sixth aspect, connector (6, 6*b*, 6*c*) is integrated with substrate guide (3), in the fifth aspect.

Motor unit (1, 1a, 1b, 1c, 1d) according to the sixth aspect makes it possible to reduce the number of the components of motor unit (1, 1a, 1b, 1c, 1d).

In motor unit (1, 1a, 1b, 1c, 1d) according to a seventh aspect, motor case (4) includes, in the fifth or sixth aspect, a metal portion.

Motor unit (1, 1a, 1b, 1c) according to an eighth aspect further includes, in any one of the fifth to seventh aspects, bottom plate (5). Bottom plate (5) is attached to motor case (4) to cover an opening of motor case (4). Restriction portion (8, 8a) includes contact portion (82). Contact portion (82) comes into contact with bottom plate (5) when a force is applied to connector (6, 6b, 6c) toward a direction where bottom plate (5) is attached.

With motor unit (1, 1a, 1b, 1c) according to the eighth aspect, restriction portion (8, 8a) can reduce deformation of connector (6, 6b, 6c) by coming into contact with bottom plate (5).

Motor unit (1, 1a, 1b, 1c) according to a ninth aspect has, in the eighth aspect, predetermined gap (δ1) between bottom plate (5) and contact portion (82).

In motor unit (1, 1a, 1b, 1c) according to a tenth aspect, bottom plate (5) and contact portion (82) are in contact with each other in a state where no external force is applied, in the eighth aspect.

In motor unit (1, 1a, 1b, 1c) according to an eleventh aspect, contact portion (82) has, in any one of the eighth to tenth aspects, a thicker thickness in the radial direction orthogonal to the axial center direction than its periphery.

In motor unit (la) according to a twelfth aspect, restriction portion (8a) includes, in any one of the first to eleventh aspects, claw portion (83) that embraces connector (6) by snap-fitting.

In motor unit (1a) according to a twelfth aspect, claw portion (83) that embraces connector (6) is provided. With this arrangement, connector (6) can be fixed by snap-fitting. Therefore, the displacement of connector (6) can be easily restricted.

In motor unit (1d) according to a thirteenth aspect, restriction portion (8d) includes, in the fourth aspect, fixing portion (84) that is formed integrally with the connector and is screwed to fan case (7).

With motor unit (1d) according to the thirteenth aspect, restriction portion (8d) can be reliably and easily fixed to the fan case.

In motor unit (1, 1a, 1b, 1c, 1d) according to a fourteenth aspect, connection terminal (63, 63b, 63c) includes, in any one of the first to thirteenth aspects, elastic portion (634) having elasticity.

With motor unit (1, 1a, 1b, 1c, 1d) according to the fourteenth aspect, when a force is applied to connector (6, 6b, 6c), connection terminal (63, 63b, 63c) can alleviate the force.

In motor unit (1, 1a, 1b, 1c, 1d) according to a fifteenth aspect, connector (6, 6b, 6c) is an insertion-mounting type connector, in any one of the first to fourteenth aspects.

Motor unit (1, 1a, 1b, 1c, 1d) according to the fifteenth aspect makes it possible to connect connector (6, 6b, 6c) to substrate (2) more easily as compared with the case of surface mounting.

A moving body (vehicle 9) according to a sixteenth aspect includes motor unit (1, 1a, 1b, 1c, 1d) according to any one of the first to fifteenth aspects and moving body main body (vehicle body 94). Motor unit (1, 1a, 1b, 1c, 1d) is mounted on the moving body main body.

In the moving body (vehicle 9) according to the sixteenth aspect, in a motor unit (1, 1a, 1b, 1c, 1d), restriction portion (8, 8a, 8d) is brought into contact with connector (6, 6b, 6c) to restrict the displacement of connector (6, 6b, 6c) with respect to substrate (2). With this arrangement, the deformation of connector (6, 6b, 6c) can be reduced. As a result, it is possible to alleviate the stress from connector (6, 6b, 6c) to substrate (2).

Motor unit (1b) according to a seventeenth aspect includes motor (11), substrate (2), motor case (4), and connector (6b). In motor (11), rotor (111) including rotary shaft (113) extending in an axial center direction (first direction D1) rotates about an axial center of rotary shaft (113) as a rotation center. Substrate (2) is provided with a circuit element constituting drive circuit (13) that drives motor (11). Motor case (4) houses motor (11) and holds substrate (2). Connector (6b) includes connection terminal (63b) directly connected to substrate (2). Connector (6b) further includes housing portion (62b) that houses connection terminal (63b). Housing portion (62b) includes first member (65) and second member (66). First member (65) is provided on substrate guide (3). Second member (66) is provided on bottom plate (5).

Motor unit (1c) according to an eighteenth aspect includes motor (11), substrate (2), motor case (4), fan (12), fan case (7), and connector (6c). In motor (11), rotor (111) including rotary shaft (113) extending in an axial center direction (first direction D1) rotates about an axial center of rotary shaft (113) as a rotation center. Substrate (2) is provided with a circuit element constituting drive circuit (13) that drives motor (11). Motor case (4) houses motor (11) and holds substrate (2). Fan (12) is rotated by motor (11). Fan case (7) houses fan (12). Connector (6b) includes connection terminal (63c) directly connected to substrate (2). Connector (6b) further includes housing portion (62c) that houses connection terminal (63c). Housing portion (62c) is provided integrally with fan case (7).

INDUSTRIAL APPLICABILITY

As described above, by using the motor unit and the moving body of the present disclosure, it is possible to provide a motor unit and a moving body capable of alleviating a stress from a connector to a substrate.

REFERENCE MARKS IN THE DRAWINGS

1, 1a, 1b, 1c, 1d motor unit
11 motor
12 fan
13 drive circuit
2 substrate
21 through-hole
22 attachment hole
23 pin insertion hole
3 substrate guide
31 opening
32 protruding portion
33 insertion hole
4 motor case
41 bottom face portion
42 cylindrical portion
43 annular portion
44 cylindrical portion
45 end portion
46, 47 through-hole
5 bottom plate
51 bottom face portion
52 cylindrical portion 53 end portion
54, 55 through-hole
6, 6b, 6c connector
61, 61b, 61c connection unit
62, 62b, 62c housing portion
63, 63b, 63c connection terminal
64, 64b, 64c terminal holding portion
65 first member
66 second member
7 fan case
71 first member
72 second member
73 opening
74 exhaust port
75 through-hole
8, 8a, 8d restriction portion
81, 81a protruding portion
82 contact portion
83 claw portion
84 fixing portion
9 vehicle (moving body)
91 battery
92 controller
93 cable
94 vehicle body (moving body main body)
111 rotor
112 stator
113 rotary shaft
114 bearing
115 rotor frame
116 rotor magnet
621 housing hole
631 main body portion
632 substrate connection pin
633 cable connection pin
634 elastic portion
711 base portion
712 annular portion
713 protruding portion
714 projecting portion
831 base portion
832 end portion
841 through-hole
D1 first direction (axial center direction)
D2 second direction (radial direction)
D3 third direction

The invention claimed is:

1. A motor unit comprising: a motor having a rotor that includes a rotary shaft extending in an axial center direction and rotates about an axial center of the rotary shaft as a rotation center; a substrate provided with a circuit element constituting a drive circuit for driving the motor; a motor case that houses the motor and holds the substrate; a connector including a connection terminal directly connected to the substrate; a restriction portion that restricts displacement of the connector with respect to the substrate by coming into contact with the connector; a substrate guide that supports the substrate, wherein the motor case holds the substrate via the substrate guide; and a bottom plate attached to the motor case to cover an opening of the motor case, wherein the restriction portion includes a contact portion that comes into contact with the bottom plate when a force is applied to the connector toward a direction where the bottom plate is attached.

2. The motor unit according to claim 1, wherein the restriction portion restricts displacement of the connector at least in the axial center direction.

3. The motor unit according to claim 1, wherein an insertion and removal direction of the connector is along a radial direction orthogonal to the axial center direction.

4. The motor unit according to claim 1, further comprising:
a fan attached to a part of the rotary shaft protruding from the motor case; and
a fan case that houses the fan,
wherein the restriction portion includes a protruding portion protruding from a part of the fan case and facing the connector.

5. The motor unit according to claim 4, wherein the restriction portion has a fixing portion formed integrally with the connector and screwed to the fan case.

6. The motor unit according to claim 1, wherein
the connector further includes a housing portion that houses the connection terminal, and
the housing portion is formed integrally with the substrate guide.

7. The motor unit according to claim 1, wherein the motor case includes a metal portion.

8. The motor unit according to claim 1, wherein a predetermined gap is provided between the bottom plate and the contact portion.

9. The motor unit according to claim 1, wherein in a state where no force is applied from outside, the bottom plate and the contact portion are in contact with each other.

10. The motor unit according to claim 1, wherein the contact portion has a thicker thickness in the radial direction orthogonal to the axial center direction than a periphery of the contact portion.

11. The motor unit according to claim 1, wherein the restriction portion includes a claw portion that embraces the connector by snap-fitting.

12. The motor unit according to claim 1, wherein the connection terminal includes an elastic portion having elasticity.

13. The motor unit according to claim 1, wherein the connector is an insertion-mounting type connector.

14. A moving body comprising:
the motor unit according to claim 1; and
a moving body main body that the motor unit is mounted on.

* * * * *